United States Patent [19]

Nelson et al.

[11] 4,110,279
[45] Aug. 29, 1978

[54] HIGH TEMPERATURE POLYMERS FROM METHOXY FUNCTIONAL ETHER AROMATIC MONOMERS

[75] Inventors: Donald L. Nelson, Lake Jackson, Tex.; Norman T. Herbert, Bay City, Mich.

[73] Assignee: The Dow Chemical Company, Midland, Mich.

[21] Appl. No.: 765,143

[22] Filed: Feb. 3, 1977

Related U.S. Application Data

[63] Continuation-in-part of Ser. No. 445,513, Feb. 25, 1974.

[51] Int. Cl.$^2$ .............. C08L 91/00; C08G 16/02
[52] U.S. Cl. ................ 260/19 R; 260/17.2; 528/171; 528/219; 528/150; 528/153; 528/155; 528/125; 528/127; 528/176
[58] Field of Search ............ 260/52, 47 R, 19 R, 260/47 EP

[56] References Cited

U.S. PATENT DOCUMENTS

| | | | |
|---|---|---|---|
| 2,579,470 | 5/1971 | Runk | 260/52 |
| 3,401,139 | 9/1968 | Wertz et al | 260/52 |
| 3,940,448 | 2/1976 | Hoy | 260/611 A |
| 3,960,982 | 6/1976 | Numata et al. | 260/52 |

*Primary Examiner*—Joseph L. Schofer
*Assistant Examiner*—Peter F. Kulkosky
*Attorney, Agent, or Firm*—Glwynn R. Baker

[57] ABSTRACT

A polymer derived by heating in the presence of an acid catalyst at between about 65° C and 260° C I. a reaction product, a cogeneric mixture of alkoxy functional compounds, having average equivalent weights in the range from about 220 to about 1200, obtained by heating in the presence of a strong acid at about 50° C to about 250° C
  (A) a diaryl compound selected from naphthalene, diphenyl oxide, diphenyl sulfide, their alkylated or halogenated derivatives or mixtures thereof,
  (B) formaldehyde or formaldehyde-yielding derivative,
  (C) water, and
  (D) a hydroxy aliphatic hydrocarbon compound having at least one free hydroxyl group and from 1 to 4 carbon atoms, which mixture contains up to 50 percent by weight unreacted (A); with II. at least one monomeric phenolic reactant selected from the group

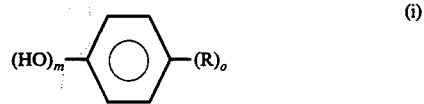

(i)

wherein R is selected from the group consisting of

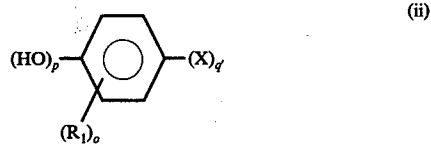

(ii)

hydrogen, alkyl radical of 1–20 carbon atoms, aryl radical of 6–20 carbon atoms, wherein $R_1$ represents hydrogen, alkyl or aryl, $m$ represents an integer from 1 to 3; $o$ represents an integer from 1 to 5; $p$ represents an integer from 0 to 3; X represents oxygen, sulfur or alkylidene; and $q$ represents an integer from 0 to 1; and, III. optionally an aldehyde or an aldehyde-yielding derivative or a ketone, for from several minutes to several hours.

These polymeric materials are liquids or low melting solids which are capable of further modification to thermoset resins. These polymers are capable of being thermoset by heating at a temperature of from about 130° C to about 260° C for from several minutes to several hours in the presence of a formaldehyde-yielding compound. These polymers are also capable of further modification by reacting under basic conditions with formaldehyde with or without a phenolic compound. The polymers, both base catalyzed resoles and acid catalyzed novolacs are useful as laminating, molding, film-forming and adhesive materials. The polymers, both resoles and novolacs, can be epoxidized as well as reacted with a drying oil to produce a varnish resin.

18 Claims, No Drawings

HIGH TEMPERATURE POLYMERS FROM METHOXY FUNCTIONAL ETHER AROMATIC MONOMERS

CROSS-REFERENCE TO RELATED APPLICATION

This application is a continuation-in-part of our copending application Ser. No. 445,513 filed Feb. 25, 1974.

The present invention is related to copending U.S. Pat. Applications Ser. No. 595,939 filed July 14, 1975, entitled "Formaldehyde Diaromatic Ether Reaction Products", filed by Raymond A. Plepys and Edgar F. Hoy, now abandoned, which is a continuation-in-part of Ser. No. 378,459, filed July 12, 1973, (now abandoned); Ser. No. 394,011, filed Sept. 4, 1973 entitled "High Temperature Polymers" by Donald L. Nelson; Ser. No. 445,514 filed Feb. 25, 1974, entitled "Formaldehyde Diaromatic Ether Reaction Products" by E. F. Hoy, now U.S. Pat. No. 3,940,448 granted Feb. 24, 1976; and Ser. No. 687,132, filed May 17, 1976 entitled "Improved Thermosettable Resins and Frictional Materials Made Therefrom", by Benton Paul Webb and Donald Louis Nelson, each of which is incorporated in its entirety in this application.

BACKGROUND OF THE INVENTION

Organic condensation products derived from halomethylated diaromatic ethers as well as from poly(methylol diaromatic ethers) to produce poly(methylene diaromatic ethers) are described in several U.S. patents, namely, U.S. Pat. Nos. 2,911,380, 3,004,072, 3,000,839, 3,269,973 and 3,342,873. The polymers, prepared in accordance with these patents, have good thermal stability and are useful in molding, potting and film forming. The techniques for their preparation described in the literature, including the patent literature above set forth, have suffered from the by-product halogen acid produced at one stage or another. The production of the halogen acid creates a handling problem during manufacture as well as the difficulty in removing the traces of the acid from the final product.

Another difficulty with the prior art techniques is that the monomers are not readily formed into prepolymers which are more economical to employ as well as more precise in applications such as molding and potting than monomeric-containing formulations.

The present invention differs from the prior art in field of conventional aromatic formaldehyde precursor resins by employing as the starting precursor a methoxy functional aromatic ether mixture which is reacted with a phenolic compound, with formaldehyde, to yield either a heat curable (thermosetting resin) or with or without formaldehyde to yield thermoplastic resin which may be subsequently thermoset with a formaldehyde donor (i.e., hexamethylene tetraamine). The ether functionality is unique because it is intermediate the polymeric structure as well as terminal, thus providing reactive sites within the polymer precursor for a different structural characteristic than resins prepared from the art-taught precursors. For example, the product of the present invention can be compared with numerous art references in the following manner:

Precursor:

This invention - The result of reacting an aromatic hydrocarbon, e.g., naphthalene or diphenyl oxide, hereafter A, with a formaldehyde-yielding compound, e.g., formaldehyde or paraformaldehyde, and an alcohol, e.g., methanol, to yield a mixture of methoxy functional ether alkyl aromatics, such as

, A—CH$_2$OCH$_3$, CH$_3$OCH$_2$—A—CH$_2$OCH$_3$,

, A—CH$_2$OCH$_2$OCH$_3$,
A—CH$_2$OCH$_2$OCH$_2$—A—CH$_2$OCH$_3$,

CH$_3$OCH$_2$—A—CH$_2$—A—CH$_2$OCH$_2$—A—CH$_2$OCH$_3$, for example, most of which have been identified by analysis.

The prior art - Represented by Krzikalla et al., U.S. Pat. No. 2,954,360, Kester, U.S. Pat. No. 2,330,827, Rosen, U.S. Pat. No. 2,237,634, Imoto, U.S. Pat. No. 3,165,558, Nastukoff, U.S. Pat. No. 1,827,538, Harris et al., U.S. Pat. No. 3,787,350, Kakiuchi et al., U.S. Pat. No. 3,303,167, Erich, U.S. Pat. No. 2,914,579, Brachel, Canadian Pat. No. 654,676, Harris et al., and British Pat. No. 1,228,778 each discloses the reaction of formaldehyde with an aromatic hydrocarbon. These representative patents of the art each produce a precursor having the following probable structure wherein A is the aromatic hydrocarbon moiety:

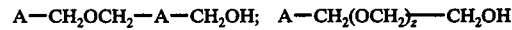

The products have oxygen contents from about 5 to 12 percent depending upon the starting aromatic, the ratio of formaldehyde to aromatic, and, the degree to which the condensation is carried out.

Some of this considerable art teaches the use of methanol during the preparation of the aromatic hydrocarbon-formaldehyde condensation product. Until now the alcohol, however, has been considered to merely etherify the resulting hydroxyl groups of the classic condensation product reducing the number of terminal hydroxyl moieties available for reacting with the activated hydrogens of the aromatic reactant to form methylene bridges. It also has been shown, Zinke and Ziegler, Weiner Chemiker Z. 47, 151 (1944) and Wegler, Z. Angew. Chem. A 60, 88–96 (1948) that internal ethers of the aromatic methylol intermediates can be produced under certain conditions.

The Erich U.S. Pat. No. 2,914,579, discloses these aspects of aromatic-aldehyde reactions, but does not teach more, preferring to illustrate the advantages of using xylenes and capping the aromatic methyl hydroxy moiety to the methylol moiety to reduce condensations. The reference never employs methanol in quantities sufficient to obtain the inner ether-polyether intermediates which are obtainable in accordance with the present invention. The reference employs 5–12 percent by weight alcohol based on formaldehyde which for the xylene employed is a ratio of 1/30 mole maximum of alcohol per mole of xylene (maximum ratio 1 mole xylene per mole formaldehyde and 5 to 12 percent by weight alcohol based on formaldehyde 0.12 × 30/106 = 1/30 mole alcohol per mole xylene) as compared to the hereinafter-disclosed range of 0.3 to 10 moles alcohol per mole of aromatic. The amount of alcohol employed by the reference is less than 1/10 that hereinafter employed which accounts for the different reaction product hereinafter obtained as compared to the patent.

Imoto et al., U.S. Pat. No. 3,165,558, discloses that 1-4 alkyl substituted aromatic hydrocarbons react with formaldehyde to produce an ". . . oxygen-containing factor of the resin (which) is due to ether (—CH$_2$O—CH$_2$—) and acetal (—CH$_2$O·CH$_2$·OCH$_2$—) bonds which bind the aromatic hydrocarbon nucleus . . . ". The oxygen contents of these resins are below 10 percent. This resin intermediate differs from that of the present invention in that the oxygen content is lower and methanol is not employed.

Kakiuchi et al., U.S. Pat. No. 3,303,167, discloses the same background as Imoto et al. above, then proceeds to described a procedure to prepare benzene or toluene aldehyde resins by using high concentrations of formaldehyde or polymers of formaldehyde in water, i.e., 3–15 percent water. The formaldehyde is also employed in a high concentration with respect to the aromatic hydrocarbon, i.e., 1–5 moles formaldehyde per mole of aromatic. The oxygen content of the product of these reactions is 7.5–20 percent and their molecular weight is 280 to 380.

Japanese Patent 45-38074 discloses use of small amounts of alcohol similar to Erich above, i.e., 20 g per 300 g xylene, 18 g per 400 g mesitylene, 10 g per 390 g naphthalene. The results of this patent appear to be similar to Erich's results. The amounts of alcohol are in the same mole ratio range as Erich, viz., 4.5 moles xylene per mole alcohol (0.2 mole alcohol/mole xylene) is the maximum.

These references all disclose the products of conventional aromatic hydrocarbon-aldehyde reactions. The acetal and ether linkages are few in number being only those derived from the occasional condensation of the methyloyl moieties probably according to

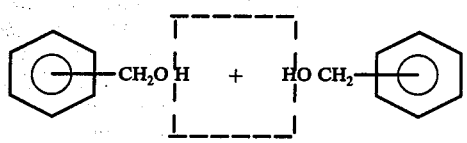

Representative of other patents which disclose oxygen-containing aromatic aldehyde resins, i.e., oxygen contents 3–12 percent, obtained by various techniques are U.S. Pat. Nos. 2,954,360; 2,330,827; 2,237,634; 3,787,350; and 1,827,538; Canada Pat. No. 654,676 and British Pat. No. 1,228,778. Each of these references obtains its oxygen content through the chance reaction of two methylol groups to produce the ether or acetal linkage.

BRIEF DESCRIPTION OF THE INVENTION

A polymer derived by heating in the presence of an acid catalyst at between about 65° C and 260° C
I. a reaction product, a cogeneric mixture of alkoxy functional compounds, having average equivalent weights in the range from about 220 to about 1200, obtained by heating in the presence of a strong acid at about 50° C to about 250° C
(A) a diaryl compound selected from naphthalene, diphenyl oxide, diphenyl sulfide, their alkylated or halogenated derivatives or mixtures thereof,
(B) formaldehyde or formaldehyde-yielding derivative,
(C) water, and
(D) a hydroxy aliphatic hydrocarbon compound having at least one free hydroxyl group and from 1 to 4 carbon atoms, which mixture contains up to 50 percent by weight unreacted (A); with
II. at least one monomeric phenolic reactant selected from the group

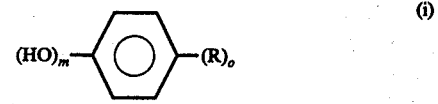

wherein R is selected from the group consisting of

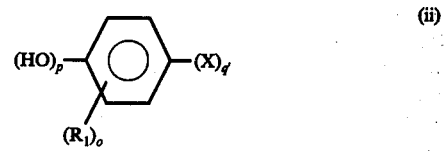

hydrogen, alkyl radical of 1–20 carbon atoms, aryl radical of 6–20 carbon atoms, wherein R$_1$ represents hydrogen, alkyl or aryl, m represents an integer from 1 to 3; o represents an integer from 1 to 5; p represents an integer from 0 to 3; X represents oxygen, sulfur or alkylidene; and q represents an integer from 0 to 1; and,
III. optionally an aldehyde or an aldehyde-yielding derivative or a ketone,
for from several minutes to several hours.

These polymeric materials are liquids or low melting solids which are capable of further modification to thermoset resins. These polymers are capable of being thermoset by heating at a temperature of from about 130° C to about 260° C for from several minutes to several hours in the presence of a formaldehyde-yielding compound. These polymers are also capable of further modification by reacting under basic conditions with formaldehyde with or without a phenolic compound. The novolac may be cured with an additional source of formaldehyde and heat and the resole may be cured with heat alone. The polymers are useful as laminating, molding, film-forming and adhesive materials can be epoxidized as well as reacted with a drying oil to produce a varnish resin.

The compounds obtained by the reaction described under (I) include those which have the formula:

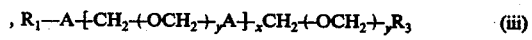

wherein each A is an independently selected aromatic radical having the formula

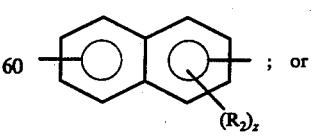
; or
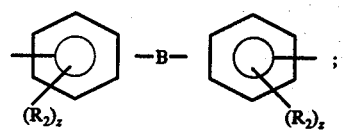
;

wherein each $R_1$ represents an independently selected radical from the group consisting of hydrogen, or $-CH_2-(OCH_2-)_yR_3$; each $R_2$ represents an independently selected radical from the group consisting of $R_1$, halogen or an alkyl group of 1 to 10 carbon atoms; $R_3$ represents a radical selected from the group consisting of hydrogen, methoxy, ethoxy, propoxy or —A—H; $x$ represents an integer from 0 to 60; $y$ represents an integer from 0 to 4; $z$ represents an integer from 0 to 2 when $R_2$ is not hydrogen; and B represents oxygen or sulfur; provided that if $x$ is 0 and A is diphenyl oxide, then $y$ must be 1 or greater for at least a portion of the reactants when the molar equivalents of phenolic compound are equal to the equivalents of alkoxy diphenyl oxide; which mixture may contain up to 50 percent by weight unreacted aromatic HAH.

The compounds which may be reacted with (I) alone, i.e., those referred to as (II) in the description and claims, and are selected from the group

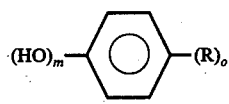
(i)

wherein R represents hydrogen, alkyl or aryl of 1 to 20 carbon atoms and

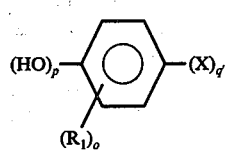
(ii)

$m$ represents an integer from 1 to 3; $o$ represents an integer from 1 to 5; $p$ represents an integer from 0 to 3; X represents oxygen, sulfur or $C_1$ to $C_3$ alkylidine; and, $q$ represents an integer from 0 to 1.

The third optional reactant (III) is an aldehyde or an aldehyde-yielding compound, i.e., formaldehyde, formal, hexamethylenetetramine, benzaldehyde and the like or a ketone, i.e., acetone.

The reaction is carried out in the presence of an acid catalyst at a temperature of from about 110° C to 190° C without an aldehyde and from about 65° C to reflux with an aldehyde each for from several minutes to several hours. Temperatures above about 190° C for the first reaction may be employed but are not recommended as the reaction is difficult to control and the products are not uniformly reproducible.

The solid or liquid products of this reaction are usable as is, the products being thermoplastic resinous material, although they are more useful when they are further cured into a thermoset polymer by heating in the presence of a formaldehyde source at from about 130° C to about 260° C for from several minutes to several hours. The products may be modified with formaldehyde added under basic conditions to produce liquid resole products which themselves are thermosettable under the same temperature conditions without an additional formaldehyde source. Good results have been obtained in the preparation of the polymer when the initial condensation occurs at 140° C to 165° C for 1 to 2 hours in admixture with about 0.2 to 0.3 weight percent of Friedel-Crafts acid catalyst and particularly the alkylated diphenyl oxide disulfonic acids. The ratio of reactants I and II is not technically critical since excess phenolic can be built into the resin system by the use of formaldehyde. The art recognized ratio of phenolic and formaldehyde reactants is incorporated herein.

It is to be understood that a resole resin can be prepared by adjusting the phenolic and formaldehyde content in excess of that which will react under acidic conditions and follow the acidic reaction with basic conditions and heating as an alternative to carrying out the acidic reaction followed by adding more formaldehyde and phenolic under basic conditions.

The reaction compounds, i.e., the starting materials (I), can be prepared individually but are more economically prepared as an admixture according to the following process.

A preferred starting material (I) is a mixture of products each having the formula

(iii)

wherein each A is an independently selected aromatic radical having the formula

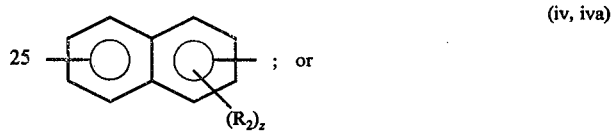
(iv, iva)

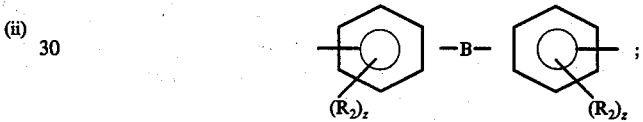

wherein each $R_1$ represents an independently selected radical from the group consisting of hydrogen, or $-CH_2-(OCH_2-)_yR_3$; each $R_2$ represents an independently selected radical selected from the group consisting of $R_1$, halogen or an alkyl group of 1 to 10 carbon atoms; $R_3$ represents a radical selected from the group consisting of hydrogen, methoxy, ethoxy, propoxy or —A—H; $x$ represents an integer from 0 to 60; $y$ represents an integer from 0 to 4; $z$ represents an integer from 0 to 2 when $R_2$ is not hydrogen; and B represents oxygen or sulfur; provided that if $x$ is 0 and A is diphenyl oxide then $y$ must be 1 or greater for at least a portion of the reactants when the molar equivalents of phenolic compound are equal to the equivalents of alkoxy diphenyl oxide; which mixture may contain up to 50 percent by weight unreacted aromatic HAH.

The process of making the reaction (condensation) products, the cogeneric mixture having an average equivalent weight in the range from about 220 to about 1200, which are the starting materials (I) of the present invention comprises heating to a temperature in the range from about 50° C to about 250° C a mixture of (A) a diaryl compound selected from naphthalene, diphenyl sulfide and/or diphenyl oxide, their alkylated and/or halogenated derivatives, alone or in combination with each other, i.e., naphthalene admixed with diphenyl oxide, and/or diphenyl sulfide, and/or alkylated and/or halogenated derivatives thereof, or mixtures thereof,
(B) formaldehyde,
(C) water, and
(D) a hydroxy aliphatic hydrocarbon compound having at least one free hydroxyl group and from 1–4 carbons in the presence of a catalytic amount of a strong acid catalyst wherein the amount of formaldehyde used ranges from about 1 to about 3 moles per mole of diaryl compound, the amount of water ranges from about 0.01 to about 2 moles per mole of diaryl compound and the amount of hydroxy hydrocarbon compound ranges from about 0.3 to about 10 moles per mole of diaryl compound.

The various techniques for preparing these starting products are described in the aforementioned related applications Ser. No. 595,939 and U.S. Pat. No. 3,904,448 which are incorporated by reference herein.

The preferred aromatic compound which can be reacted with formaldehyde to prepare the starting products (I) of this invention are naphthalene, diphenyl ether (diphenyl oxide), diphenyl sulfide alone or in admixture one with the other. Reaction products can also be prepared from the alkylated derivatives of the foregoing wherein one or both aromatic rings are substituted by one or two alkyl groups of 1 to 10 carbon atoms each.

If desired, the aromatic compounds can be halogenated in one or both rings with fluorine, chlorine, bromine, or iodine groups. Mixtures of the foregoing are also useful in this invention.

The above aromatic compounds are mixed and reacted with about 1 to about 3 moles of formaldehyde at a temperature range from about 50° C to about 250° C in the presence of about 0.01 to about 2 moles of water per mole of aromatic compound and in the presence of about 0.3 to about 10 moles of a hydroxy aliphatic hydrocarbon compound having 1 to 4 carbon atoms and at least one free hydroxyl group.

The presence of water in the ranges recited above is essential to this invention since the use of amounts below this range results in very low yields of the desired reaction product while amounts greater than this amount result in greatly increased reaction times.

The above reaction proceeds readily in the presence of a catalytic amount of a strong acid catalyst. For the purposes of this invention, a catalytic amount is defined as about 1 to about 20 mole percent, based on the aromatic compound, of the strong acid.

Examples of strong acid catalysts are sulfuric, phosphoric, p-toluene sulfonic acid, perchloric acid, oxalic acid, alkylated diphenyl oxide disulfonic acid, and the like.

A commercial mixture of formaldehyde, methanol and water sold under the trade name Methyl Formcel ® is a convenient source of the above formaldehyde reactant. Other sources of formaldehyde are paraformaldehyde and hexamethylenetetramine.

Examples of the above hydroxy aliphatic hydrocarbon compounds are: methanol, ethanol, propanol and butanol.

The following preparations are presented to illustrate the method for preparing the starting reactant (I) and not to limit the invention.

PREPARATION A

An acid resistant pressure vessel equipped with paddle stirrer and thermowell was charged with 256 g naphthalene, 64 g of 91 percent paraformaldehyde, 36 g water, 128 g methanol and 50 g of 98 percent sulfuric acid. The mixture was heated with stirring at 143° C for 4 hours and cooled. The organic layer was diluted with 300 ml methylene chloride. This organic layer was washed with dilute (10 percent) aqueous caustic and dried. Analysis by vapor phase chromatography showed ca. 81 percent of the naphthalene had been converted to product. Following distillation of the unreacted naphthalene the residue weighed 169 g. The product exhibited a methoxy content of 5 percent and an equivalent weight of 620.

Preparation B

An acid resistant (Hastelloy C) pressure vessel with a paddle stirrer and thermowell was charged with 34 lb of diphenyl oxide, 6.6 lb of 91 percent paraformaldehyde, 12.8 lb methanol, 4 lb of 96 percent sulfuric acid and 3.6 lb of water. The mixture was heated with stirring at 146° C for 4 hours, cooled, vented with $N_2$ and left open to the atmosphere for 12 hours. The acid phase was separated. The organic phase was vacuum dried to remove the unreacted methanol, formaldehyde and water. An analysis by vapor phase chromatography showed that 50–60 percent of the diphenyl oxide had reacted.

Preparation C

An acid resistant (Hastelloy C) pressure vessel with a paddle stirrer and thermowell was charged with 34 lb of diphenyl oxide, 6.8 lb of 91 percent paraformaldehyde, 13.7 lb of methanol, 4.11 lb of 96 percent sulfuric acid and 3.7 lb of water. The mixture was heated with stirring at 146° C for 4 hours, cooled, vented with $N_2$ and left open to the atmosphere for 12 hours. The acid phase was separated. The organic phase was vacuum dried to remove the unreacted methanol, formaldehyde and water. An analysis by vapor phase chromatography showed that 50–60 percent of the diphenyl oxide had reacted.

Preparation D

An acid resistant (Hastelloy C) pressure vessel with a paddle stirrer and a thermowell was charged with 306 g of diphenyl oxide, 153.6 g of naphthalene, 96 g of 91 percent paraformaldehyde, 192 g methanol, 60 g of 96 percent sulfuric acid, 54 g of water. The mixture was heated to 155° C for 3-½ hours and cooled. The organic phase was decanted and diluted with 100 g of methylene chloride. The resulting solution was washed twice with 100 g of water and then vacuum dried. An analysis by vapor phase chromatography showed ≈50 percent of the naphthalene and 60 percent of the diphenyl oxide had been converted to product. Gel permeation chromatography showed this material had an equivalent weight of 337.

Preparation E

An acid resistant (Hastelloy C) pressure vessel with a paddle stirrer and thermowell was charged with 450 g of diphenyl oxide, 84.7 g of 91 percent paraformaldehyde, 169.4 g of methanol, 52.9 g of 96 percent sulfuric acid and 47.6 g of water. The mixture was heated with stirring at 146° C for 4 hours, cooled, vented with $N_2$ and left open to the atmosphere for 12 hours. The acid phase was separated. The organic phase was vacuum dried to remove the unreacted methanol, formaldehyde and water. An analysis by vapor phase chromatography showed that 50–60 percent of the diphenyl oxide had reacted.

Detailed Description of the Invention

The following examples employing the heretofore prepared methoxy functional reactants (I) are reacted in accordance with the present invention and are presented to illustrate but not limit the invention.

EXAMPLE 1

An acid resistant vessel equipped with a stirrer, thermowell, Dean Stark Trap and a condenser was charged with 90 g of the methoxy functional methyl naphthalene product obtained in Preparation A, (having an average equivalent weight of about 620) and 0.36 g of dodecyl diphenyl oxide disulfonic acid and 60.6 g of 90 percent phenol. The products were stirred for approximately 1 hour at 120° C and approximately 1-½ hours at 160° C. After drawing off 11.6 ml of distillate, the Dean Stark Trap was removed and replaced with a condenser and the temperature reduced to 90° C. Formaldehyde, 24.3 g of 37 percent, was added; the reaction held at 90° C–100° C (reflux) for 1-½ hours at which point 1 g of oxalic acid was added. After three additional hours at 90° C–100° C the formaldehyde content was ½ g per 100 ml of solution. Thereupon the resin was stripped at 175° C at 6 mm Hg and a hard resin with a ring and ball softening point of 85° C was obtained. When mixed with 15 percent by weight hexamethylenetetramine, a gel time of 1 minute 5 seconds was observed at 175° C. The phenolic hydroxyl content was 6.2 percent.

EXAMPLE 2

To a three-necked flask equipped with a condenser, stirrer, thermocouple, and Dean Stark Trap was added the following:
  94.1 g phenol USP crystals (1 mole)
  147.6 g polymethoxy methyl diphenyl oxide (0.5 eq) (contains 10.5 percent $OCH_3$) Preparation B
  0.5 g concentrated sulfuric acid Heating was begun using infrared lamps. The temperature was raised to 100° C at which time the batch exothermed to 110° C heated to 120° C in 3 minutes and held for 6 minutes, then heated to 150° C and held for 20 minutes. At this point 18.5 ml of methanol was removed which is 92.5 percent of the theoretical methanol. The reaction mixture was cooled to 50° C, 20.6 g of 91 percent formaldehyde was added and the resulting mixture heated to 65° C. Thereafter, 12.1 g of $NH_4OH$ was slowly added over a 10-minute period. The resulting mixture was heated to 80° C and 25 ml of 50:50 2-B alcohol:toluene was added to control viscosity. Upon removal of 19 ml of water-solvent under vacuum dehydration at 80° C, there was obtained a clear resin.

The resulting resin tested 92.6 percent solids. The resin cured on a hot plate in 1 minute 42 seconds at 175° C.

EXAMPLE 3

To a resin flask equipped with a reflux condenser, stirrer, cooling coils and thermocouple was charged the following:
  1473.0 g phenol USP crystals (15.65 moles)
  361.3 g 91 percent p-formaldehyde (10.96 moles)
  22.1 g oxalic acid (1.5 percent on weight of phenol)
  200.0 g toluene The temperature was raised to 80° C by heating with infrared lamps, at which point the batch exothermed to 85° C. This required approximately 43 minutes. The resin was then heated to 95° C in 12 minutes. It again exothermed to 100° C and was cooled to 90° C. The resin was again heated to 100° C and allowed to boil for approximately 15 minutes. A Dean Stark Trap was placed on the reactor and water and solvent removed.

After 30 minutes 180.0 g of polymerized methoxy functional diphenyl oxide (Preparation C), which was previously polymerized with 75 percent of the theoretical MeOH removed, was added. After reacting at 100° C for 195 minutes, 135 ml of distillate was collected.

The resulting resin was then vacuum dehydrated and held at 185° C under 30 mm Hg. 50 ml of o-dichlorobenzene had to be added to stop foaming.

The finished resin had a ring and ball softening point of 98° C, and a phenolic hydroxyl content is 15.0 percent.

The above resin was pulverized and then blended in the following manner:
  375.0 g Resin
  375.0 g Wood Flour
  45.0 g Hexamethylenetetramine
  2.7 g Calcium stearate The blend was then advanced on compounding rolls for two minutes. The front roll was between 150° C–160° C and the back roll 120° C–135° C. The compound after being removed from the rolls and cooled was ground.

Sixty grams of the molding powder was placed in a circular mold measuring 4 inches in diameter which was previously heated to 350° F in a Hydraulic Press. The compression mold was assembled and cured at 350° F for 3 minutes under 5000 psi. A good molding resulted.

EXAMPLE 4

An acid resistant vessel equipped with a stirrer, thermowell, Dean Stark Trap and condenser was charged with 80 g (0.23 equivalents) of naphthalene modified methoxy functional diphenyl oxide with an equivalent weight of about 337, Preparation D, 0.4 g of dodecyl diphenyl oxide disulfonic acid and 96.1 g of 90 percent phenol. The reactants were stirred for one hour, starting at 120° C and finishing at 160° C. 21.8 ml of distillate were removed and after cooling to 90° C the Dean Stark Trap was replaced with a condenser. 41.3 g of 37 percent formaldehyde solution were added and the reaction mass was brought to reflux. After 5 hours at reflux the formaldehyde content was ¾ g per 100 ml of solution. The resin was then stripped at a finish temperature of 200° C at 11 mm of Hg. A hard resin with a ring and ball softening point of 100° C resulted. When mixed with 15 percent hexamethylene tetra amine, a gel time of 45 seconds 175° C resulted.

EXAMPLE 5

A reaction vessel, equipped as above, was charged with 400 g of methoxy functional diphenyl oxide with an average equivalent weight of 295 (prepared in a similar manner as Preparations B, C and E) and 2 g of dodecyl diphenyl oxide disulfonic acid. The product was polymerized to 30 percent of its maximum potential as measured by the distillate which was 16.4 ml at this point. The equivalent weight of the product then equaled approximately 422. The reaction time was about 2 hours, starting at 130° C and finishing at 140° C. At this point 384 g of 90 percent phenol were added. After a reaction time of 8–10 hours at temperature between 120° C and 160° C the product was stripped at a maximum temperature of 180° C and 2.5 mm of Hg. A resinous product with a melt point of 53° C resulted. When mixed with 15 percent hexamethylenetetramine, a stroke cure time of 13 minutes at 175° C resulted. When the temperature was raised to 200° C, the cure time was 1-½ minutes.

The phenolic hydroxyl content is 3.6 percent.

EXAMPLE 6

A reaction vessel, equipped as above, was charged with 100 g of methoxy functional diphenyl oxide with a methoxy content of 13.3 percent and an equivalent weight of 233 (Preparation E), 0.4 g of dodecyl diphenyl oxide disulfonic acid, and 255 g of p-tert-butylphenol. After a reaction time of 3-½ to 4 hours at temperatures starting at 120° C and finishing at 190° C, about 17 ml of distillate was collected. The temperature was reduced to 90° C. At this point, 2 g of oxalic acid and 31.5 g of 91.5 percent p-formaldehyde were added. The product was cooked at reflux until the formaldehyde analysis attained ⅛ g per 100 ml of solution. The product was then stripped at a maximum temperature of 240° C and 4 mm of Hg. A hard clear resin with a ring and ball softening point of 102° C resulted.

A varnish was prepared, using tung oil, which had normal drying properties.

EXAMPLE 7

The resin of Example 5 was epoxidized with epichlorohydrin followed by caustic-carbonate treatment in the following manner:

To a 250 ml 3-neck flask were added 25 g of the resin of Example 5 and 110 ml of epichlorohydrin. This reaction mixture was stirred at 40° C; 0.25 g of benzyl trimethyl ammonium chloride (60 percent in water) was added, then stirred for 48 hours. The excess epi was removed in vacuo. The resulting residue was dissolved in benzene, to which 50 ml of caustic-carbonate (16 percent NaOH and 9 percent $Na_2SO_4$) was added and stirred at 65° C for 1.5 hours. The layers were separated and 50 ml of caustic-carbonate was added to the benzene layer and stirred at 65° C for 30 minutes. The caustic-carbonate and benzene layers were separated and the organic layer was washed with water until the water had a pH of 6. The volume of the organic layer was reduced in vacuo to yield an epoxide.

The chemical data of the epoxidized product is listed below:

| | |
|---|---|
| % Epoxide | 5.2 |
| % Cl⁻ | 0.7 |
| Epoxide Equivalent Wt. | 830 |
| Softening Point, ° C | ~33 |

The compound was cured with appropriate curing agents. The curing data and time to gel are as follows:

| | |
|---|---|
| Methyl nadic Anhydride | 180 sec. |
| Triethylene tetra amine | 91 sec. |
| Dimethylaniline | 13 min. |
| Dicyandiamide | 18+ min. |

We claim:

1. A polymer derived by heating in the presence of an acid catalyst at between about 65° C and 260° C
   I. a cogeneric mixture of alkoxy functional compounds, having an average equivalent weight in the range from about 220 to about 1200, obtained by heating together in the presence of a strong acid at about 50° C to about 250° C;
      (A) a diaryl compound selected from naphthalene, diphenyl oxide, diphenyl sulfide, their alkylated or halogenated derivatives or mixtures thereof,
      (B) formaldehyde or formaldehyde-yielding derivative,
      (C) water, and
      (D) a hydroxy aliphatic hydrocarbon compound having at least one free hydroxyl group and from 1 to 4 carbon atoms,
   which mixture contains 0 to 50 percent by weight unreacted (A); with
   II. up to one monomeric phenolic reactant per equivalent of I selected from the group

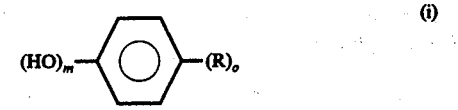

wherein R is selected from the group consisting of

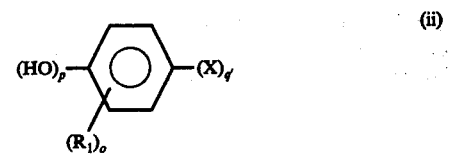

hydrogen, alkyl radical of 1 to 20 carbon atoms, aryl radical of 6 to 20 carbon atoms, $R_1$ represents hydrogen, alkyl or aryl, m represents an integer from 1 to 3, o represents an integer from 1 to 5; p represents an integer from 0 to 3; X represents oxygen, sulfur or $C_1$ to $C_3$ alkylidene; and, $q'$ represents an integer from 0 to 1.

2. A polymer derived by heating in the presence of an acid catalyst at between about 65° C and 260° C
   I. a reaction mixture of alkoxy functional compounds having average molecular weights in the range from 220 to 1200 obtained by heating together in the presence of a strong acid at about 50° C to about 250° C;
      (A) a diaryl compound selected from naphthalene, diphenyl oxide, diphenyl sulfide, their alkylated or halogenated derivatives or mixtures thereof,
      (B) formaldehyde or formaldehyde-yielding derivative,
      (C) water, and
      (D) a hydroxy aliphatic hydrocarbon compound having at least one free hydroxyl group and from 1 to 4 carbon atoms, which mixture contains 0 to 50 percent by weight unreacted (A); with
   II. more than one monomeric phenolic reactant per equivalent of I selected from the group

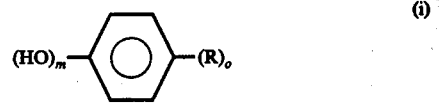

wherein R is selected from the group consisting of

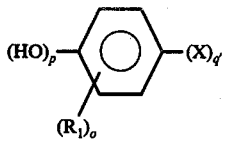

hydrogen, alkyl radical of 1 to 20 carbon atoms, aryl radical of 6 to 20 carbon atoms, $R_1$ represents hydrogen, alkyl or aryl, $m$ represents an integer from 1 to 3, $o$ represents an integer from 1 to 5; $p$ represents an integer from 0 to 3; X represents oxygen, sulfur or $C_1$ to $C_3$ alkylidene; and, $q'$ represents an integer from 0 to 1; and a source of an aldehyde in the presence of a strong acid catalyst.

3. A polymer derived by heating in the presence of an acid catalyst at between about 65° C and 260° C I. a mixture of alkoxy functional compounds having average molecular weights in the range from 220 to 1200 obtained by heating together in the presence of a strong acid at about 50° C to about 250° C;
  (A) a diaryl compound selected from naphthalene, diphenyl oxide, diphenyl sulfide, their alkylated or halogenated derivatives or mixtures thereof,
  (B) formaldehyde or formaldehyde-yielding derivative,
  (C) water, and
  (D) a hydroxy aliphatic hydrocarbon compound having at least one free hydroxyl group and from 1 to 4 carbon atoms,
  which mixture contains 0 to 50 percent by weight unreacted (A); with
II. a monomeric phenolic reactant selected from the group

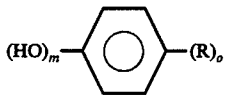

wherein R is selected from the group consisting of

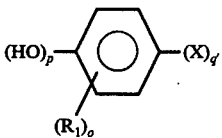

hydrogen, alkyl radical of 1 to 20 carbon atoms, aryl radical of 6 to 20 carbon atoms, $R_1$ represents hydrogen, alkyl or aryl, $m$ represents an integer from 1 to 3, $o$ represents an integer from 1 to 5; $p$ represents an integer from 0 to 3; X represents oxygen, sulfur or $C_1$ to $C_3$ alkylidene; and, $q'$ represents an integer from 0 to 1; and optionally a source of an aldehyde in the presence of an acidic catalyst; with III. an additional source of an aldehyde and a basic catalyst.

4. A thermoset resin derived by heating the product of claim 1 with a formaldehyde-yielding source.

5. A thermoset resin derived by heating the product of claim 2 with a formaldehyde-yielding source.

6. A thermoset resin derived by heating the product of claim 3.

7. The thermoset polymer of claim 4 wherein the formaldehyde source is hexamethylenetetramine and said amine is present in about 7 to about 20 weight percent.

8. The thermoset polymer of claim 5 wherein the formaldehyde source is hexamethylenetetramine and said amine is present in about 7 to about 20 weight percent.

9. A polymer derived according to the process of claim 2 by heating at between about 120° C and 160° C for about 2-½ hours in the presence of dodecyl diphenyl oxide disulfonic acid and phenol, a methoxy functional methyl naphthalene product having an average equivalent weight of about 620, said methoxy functional methyl naphthalene derived by heating
  naphthalene
  paraformaldehyde
  water, and
  methanol
in the presence of sulfuric acid for about 4 hours at about 143° C.

10. A polymer derived according to claim 3 by heating phenol with polymethoxy methyl diphenyl oxide in the presence of sulfuric acid at 100° C to 150° C for about 29 minutes, adding formaldehyde to said product at about 65° C and then adding ammonium hydroxide slowly, the said polymethoxy methyl diphenyl oxide being the homopolymerized product of the reaction of diphenyl oxide, paraformaldehyde, methanol, water and sulfuric acid reacted together at about 146° C for about 4 hours.

11. A polymer derived by heating at between about 80° C and 100° C for about an hour and 10 minutes
  phenol
  paraformaldehyde
  oxalic acid
in toluene, removing the solvent and adding a homopolymerized methoxy functional diphenyl oxide and heating at about 100° C for about 3 hours and 15 minutes, said diphenyl oxide being initially prepared by reacting diphenyl oxide paraformaldehyde, methanol, water and sulfuric acid with heating at about 146° C for about 4 hours, then vacuum dried to polymerize the product by removal of about 75 percent of the theoretical methanol.

12. A polymer derived by reacting by heating a methoxy functional naphthalene modified methoxy functional diphenyl oxide with phenol in the presence of dodecyl diphenyl oxide disulfonic acid at between about 120° C and 160° C for about 1 hour, adding formaldehyde thereto and reacting the mixture at the reflux temperature for about 5 hours, said methoxy functional diphenyl oxide being prepared by reacting
  diphenyl oxide
  naphthalene
  paraformaldehyde
  methanol
  water, and
  sulfuric acid
for about 3-½ hours at about 155° C.

13. A polymer derived by reacting a methoxy functional diphenyl oxide of average equivalent weight of 295 with dodecyl diphenyl oxide disulfonic acid for about 2 hours at about 130° C to 140° C to produce a product of average equivalent weight of about 422, adding phenol and continuing reacting by heating at between about 120° C to about 160° C for about 8 to 10 hours, said methoxy functional diphenyl oxide being prepared by reacting
- diphenyl oxide
- paraformaldehyde
- methanol
- water, and
- sulfuric acid at about 146° C for about 4 hours.

14. A polymer derived by reacting a methoxy functional diphenyl oxide, p-tert-butylphenol and dodecyl diphenyl oxide disulfonic acid at between about 120° C and 190° C for about 3-½ to 4 hours, adding oxalic acid and formaldehyde and continuing the reaction by heating at reflux until the formaldehyde content is about ⅛ gram per 100 ml, said methoxy functional diphenyl oxide being the product of the reaction of
- diphenyl oxide
- paraformaldehyde
- methanol
- sulfuric acid, and
- water heated to about 146° C for about 4 hours.

15. The epoxidized product derived by reacting the product of claim 2 with epichlorohydrin.

16. The epoxidized product derived by reacting the product of claim 3 with epichlorohydrin.

17. The varnish resin derived by reacting the product of claim 14 with a drying oil.

18. The varnish resin of claim 17 wherein the drying oil is tung oil.

* * * * *